US012783799B2

(12) United States Patent
Dai et al.

(10) Patent No.: US 12,783,799 B2
(45) Date of Patent: Nov. 3, 2026

(54) DATA ERROR CORRECTION METHOD AND APPARATUS, AND ELECTRONIC DEVICE

(71) Applicant: SHENZHEN INSTITUTES OF ADVANCED TECHNOLOGY CHINESE ACADEMY OF SCIENCES, Shenzhen (CN)

(72) Inventors: Junbiao Dai, Shenzhen (CN); Mingwei Lu, Shenzhen (CN); Xiaoluo Huang, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 172 days.

(21) Appl. No.: 18/673,562

(22) Filed: May 24, 2024

(65) Prior Publication Data

US 2024/0419897 A1 Dec. 19, 2024

Related U.S. Application Data

(63) Continuation of application No. PCT/CN2021/138004, filed on Dec. 24, 2021.

(30) Foreign Application Priority Data

Nov. 24, 2021 (CN) ......................... 202111402498.0

(51) Int. Cl.
*G06F 40/279* (2020.01)
*G06F 11/10* (2006.01)

(52) U.S. Cl.
CPC ........ *G06F 40/279* (2020.01); *G06F 11/1012* (2013.01)

(58) Field of Classification Search
CPC ...... H03M 13/25; G06F 11/08; G06F 40/274; G06F 40/279
See application file for complete search history.

(56) References Cited

U.S. PATENT DOCUMENTS 11,023,680 B2 * 6/2021 Almosallam ........... G06F 40/30
11,755,640 B2 * 9/2023 Pan ....................... G06T 1/0007 382/166
2024/0419897 A1 * 12/2024 Dai ....................... G06F 40/232

FOREIGN PATENT DOCUMENTS

CN 110276077 A 9/2019
CN 112016304 A 12/2020
(Continued)

*Primary Examiner* — Daniel Abebe
(74) *Attorney, Agent, or Firm* — Nitin Kaushik

(57) ABSTRACT

The present application is suitable for the technical field of data processing, and provides a data error correction method and apparatus and an electronic device. The method includes: decoding a base sequence to be subjected to error correction into a first text, the base sequence to be subjected to error correction being composed of a plurality of bases; performing word segmentation on the first text to obtain a plurality of text units; performing error detection on the plurality of text units to obtain a text unit having an error; and performing error correction on the base sequence to be subjected to error correction according to the text unit having the error. By means of the above method, error correction for data can be achieved, and the storage cost of DNA can also be reduced.

6 Claims, 4 Drawing Sheets

Specification includes a Sequence Listing.

(56) References Cited

FOREIGN PATENT DOCUMENTS

| | | | | | |
|---|---|---|---|---|---|
| CN | 112100982 | A | | 12/2020 | |
| CN | 112100982 | B | * | 6/2023 | ........... G06F 16/316 |
| EP | 2634716 | A1 | * | 9/2013 | ............. G16B 30/00 |
| WO | WO-2021145211 | A1 | * | 7/2021 | ............ H03M 13/27 |

* cited by examiner

SEQUENCE LISTING

```
Sequence total quantity: 22
SEQ ID NO: 1            moltype = DNA  length = 14
FEATURE                 Location/Qualifiers
source                  1..14
                        mol_type = other DNA
                        organism = synthetic construct
SEQUENCE: 1
```

```
agcctactac ctct                                                    14

SEQ ID NO: 2           moltype =   length =
SEQUENCE: 2
000

SEQ ID NO: 3           moltype =   length =
SEQUENCE: 3
000

SEQ ID NO: 4           moltype =   length =
SEQUENCE: 4
000

SEQ ID NO: 5           moltype =   length =
SEQUENCE: 5
000

SEQ ID NO: 6           moltype =   length =
SEQUENCE: 6
000

SEQ ID NO: 7           moltype =   length =
SEQUENCE: 7
000

SEQ ID NO: 8           moltype =   length =
SEQUENCE: 8
000

SEQ ID NO: 9           moltype =   length =
SEQUENCE: 9
000

SEQ ID NO: 10          moltype =   length =
SEQUENCE: 10
000

SEQ ID NO: 11          moltype =   length =
SEQUENCE: 11
000

SEQ ID NO: 12          moltype =   length =
SEQUENCE: 12
000

SEQ ID NO: 13          moltype =   length =
SEQUENCE: 13
000

SEQ ID NO: 14          moltype =   length =
SEQUENCE: 14
000

SEQ ID NO: 15          moltype =   length =
SEQUENCE: 15
000

SEQ ID NO: 16          moltype =   length =
SEQUENCE: 16
000

SEQ ID NO: 17          moltype =   length =
SEQUENCE: 17
000

SEQ ID NO: 18          moltype =   length =
SEQUENCE: 18
000

SEQ ID NO: 19          moltype = DNA  length = 12
FEATURE                Location/Qualifiers
source                 1..12
                       mol_type = other DNA
                       organism = synthetic construct
SEQUENCE: 19
aggagtccta ga                                                      12

SEQ ID NO: 20          moltype = DNA  length = 12
```

-continued

```
FEATURE                 Location/Qualifiers
source                  1..12
                        mol_type = other DNA
                        organism = synthetic construct
SEQUENCE: 20
tggagtccta ga                                                            12

SEQ ID NO: 21           moltype = DNA  length = 12
FEATURE                 Location/Qualifiers
source                  1..12
                        mol_type = other DNA
                        organism = synthetic construct
SEQUENCE: 21
gggagtccta ga                                                            12

SEQ ID NO: 22           moltype =   length =
SEQUENCE: 22
000
```

DATA ERROR CORRECTION METHOD AND APPARATUS, AND ELECTRONIC DEVICE

CROSS-REFERENCE TO RELATED APPLICATIONS

The application claims priority to Chinese patent application No. 202111402498.0, filed on Nov. 24, 2021, the entire contents of which are incorporated herein by reference.

SEQUENCE LISTING

The sequence listing xml file submitted herewith, named "SEQUENCE_LISTING.xml", created on Sep. 9, 2024, and having a file size of 8,308 bytes, is incorporated by reference herein.

TECHNICAL FIELD

The present application belongs to the technical field of data processing, and particularly relates to a data error correction method and apparatus, an electronic device and a computer-readable storage medium.

BACKGROUND

With the advent of the information era, the total amount of information is constantly growing at a high speed. Relevant data indicate that the total amount of data information worldwide will increase to 163 ZB (Zettabyte) by 2025, which exceeds the bearing capacity of existing storage media such as hard disks. At present, researchers have noticed that deoxyribonucleic acid (DNA) can be used for large-scale information storage, and it has the characteristics of high storage density, long storage time, low loss rate, etc.

In existing methods, the success rate of subsequent recovery of original data is mainly improved by increasing redundant storage. For example, quadruple overlap redundancy is adopted to store a single piece of data multiple times, and then the success rate of recovery of the original data is improved subsequently by comparing multiple pieces of stored data. That is, existing methods need to combine repeatedly stored data to achieve error correction when recovering original data, while repeated data storage will increase the storage cost of DNA.

SUMMARY

Embodiments of the present application provide a data error correction method and apparatus, an electronic device and a computer-readable storage medium, which can solve the problem of the excessively high storage cost caused by the dependence on redundantly stored data when error correction is performed on data stored based on DNA.

In a first aspect, an embodiment of the present application provides a data error correction method, including:

- decoding a base sequence to be subjected to error correction into a first text, the base sequence to be subjected to error correction being composed of a plurality of bases;
- performing word segmentation on the first text to obtain a plurality of text units;
- performing error detection on the plurality of text units to obtain a text unit having an error; and
- performing error correction on the base sequence to be subjected to error correction according to the text unit having the error.

In a second aspect, an embodiment of the present application provides a data error correction apparatus, including:

- a first text determining module, configured to decode a base sequence to be subjected to error correction into a first text, the base sequence to be subjected to error correction being composed of a plurality of bases;
- a first text word segmentation module, configured to perform word segmentation on the first text to obtain a plurality of text units;
- an error detection module, configured to perform error detection on the plurality of text units to obtain a text unit having an error; and
- an error correction module, configured to perform error correction on the base sequence to be subjected to error correction according to the text unit having the error.

In a third aspect, an embodiment of the present application provides an electronic device, including a memory, a processor and a computer program stored in the memory and capable of running on the processor. The processor, when executing the computer program, implements the method of the first aspect.

In a fourth aspect, an embodiment of the present application provides a computer-readable storage medium, storing a computer program, and the computer program, when executed by a processor, implements the method of the first aspect.

In a fifth aspect, an embodiment of the present application provides a computer program product. The computer program product, when running on an electronic device, causes the electronic device to execute the method of the first aspect above.

Compared with the prior art, the embodiments of the present application have the beneficial effects:

- in the embodiments of the present application, since the base sequence to be subjected to error correction is decoded into the first text first before error correction is performed on the base sequence to be subjected to error correction, error detection may be performed on the plurality of text units obtained by word segmentation of the first text through relevant algorithms in the field of natural language processing to obtain the text unit having the error, and then error correction of the base sequence to be subjected to error correction may be achieved according to the text unit having the error. When error detection is performed on the text units through the relevant algorithms in the field of natural language processing, it can be achieved without combining repeatedly stored data, that is, no redundancy needs to be increased during DNA storage. That is, by means of the data error correction method provided by the embodiments of the present application, not only can error correction for data be achieved, but also the redundancy during data storage can be reduced, thereby reducing the storage cost of DNA.

BRIEF DESCRIPTION OF DRAWINGS

In order to describe the technical solution in embodiments of the present application more clearly, the accompanying drawings that need to be used in the description of the embodiments or the prior art will be briefly introduced below.

DETAILED DESCRIPTION OF THE EMBODIMENTS

In the following description, for the purpose of illustration instead of limitation, specific details such as particular system structures and technologies are proposed for thorough understanding of embodiments of the present application.

Embodiment 1

At present, when DNA is used as an information storage medium, in order to improve the success rate of recovery of original data, a single piece of data is stored multiple times, or an error correcting code is added into stored data. However, the redundancy will be increased regardless of which method is used, thus increasing the storage cost of DNA.

In order to solve this technical problem, an embodiment of the present application provides a data error correction method. In the data error correction method, a base sequence to be subjected to error correction is decoded into a text first, then error detection is performed on the text, and finally error correction is performed on the base sequence to be subjected to error correction based on a detection result. That is, in the embodiment of the present application, instead of directly performing error correction on the base sequence to be subjected to error correction, the base sequence to be subjected to error correction is decoded into the corresponding text first and then error correction is performed on the text, since error correction of the text can be achieved without combining repeatedly stored data, the storage cost of DNA can be effectively saved during error correction with the above method.

The data error correction method provided by the embodiment of the present application is described below in combination with specific embodiments.

Figure 1:
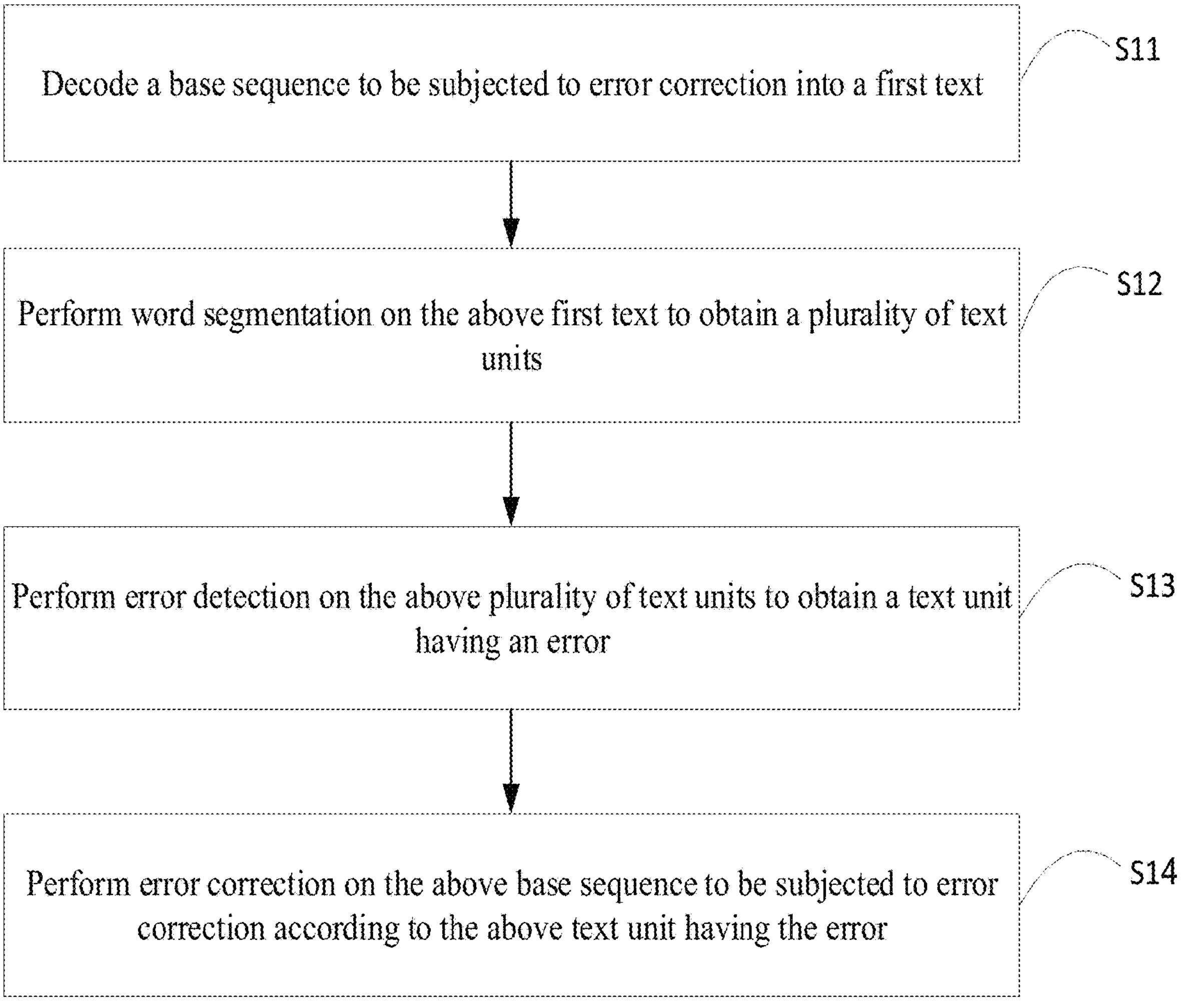
FIG. 1 is a flowchart of a data error correction method provided by an embodiment of the present application.

FIG. 1 shows a flowchart of the data error correction method provided by the embodiment of the present application, which is detailed as follows:

step S11, a base sequence to be subjected to error correction is decoded into a first text, the above base sequence to be subjected to error correction being composed of a plurality of bases.

The bases are part of deoxyribonucleotide (DNA), and there are generally four bases A, T, G and C on the DNA.

After the bases on the DNA are coded, combinations formed by different bases may be used for representing different data, and then the data are stored on the DNA. In the present embodiment, the above base sequence to be subjected to error correction is a coded base sequence, and the base sequence to be subjected to error correction includes the plurality of bases, for example, the base sequence to be subjected to error correction may be “AGCCTACTACCTCT” (SEQ ID NO. 1).

In the present embodiment, a corresponding decoding manner may be selected according to a coding manner adopted by the base sequence to be subjected to error correction, and then the base sequence is decoded into the first text by adopting this decoding manner. For example, it is assumed that the coding manner adopted by the base sequence to be subjected to error correction is: quaternary huffman coding, and every 5 successive bases are replaced with 6 bases. Thus, when the base sequence to be subjected to error correction is decoded, every 6 successive bases in the base sequence to be subjected to error correction need to be converted into corresponding 5 bases first to obtain a converted base sequence, and then the converted base sequence is decoded to obtain the first text.

Step S12, word segmentation is performed on the above first text to obtain a plurality of text units.

In the present embodiment, word segmentation may be performed on the first text by adopting a jieba word segmentation method to obtain the plurality of text units. For example, it is assumed that after jieba word segmentation is performed on a sentence “you and me” in the first text, three text units “you”, “and” and “me” are obtained.

Step S13, error detection is performed on the above plurality of text units to obtain a text unit having an error.

In the present embodiment, whether the text units obtained by word segmentation have errors is detected. Specifically, an algorithm related to the field of natural language processing may be selected to perform error detection on the text units.

Step S14, error correction is performed on the above base sequence to be subjected to error correction according to the above text unit having the error.

In the present embodiment, a base having an error may be determined in the base sequence to be subjected to error correction after the text unit having the error is determined, and then error correction of the base sequence to be subjected to error correction can be achieved.

In the embodiments of the present application, since the base sequence to be subjected to error correction is decoded into the first text first before error correction is performed on the base sequence to be subjected to error correction, error detection may be performed on the plurality of text units obtained by word segmentation of the first text through relevant algorithms in the field of natural language processing to obtain the text unit having the error, and then error correction of the base sequence to be subjected to error correction may be achieved according to the text unit having the error. When error detection is performed on the text units through the relevant algorithms in the field of natural language processing, it can be achieved without combining repeatedly stored data, that is, no redundancy needs to be increased during DNA storage. That is, by means of the data error correction method provided by the embodiments of the present application, not only can error correction for data be achieved, but also the redundancy during data storage can be reduced, thereby reducing the storage cost of DNA.

In some embodiments, step S14 above includes:

A1, a base group having an error is determined according to the above text unit having the error to obtain a target base group, wherein each base group above is composed of every N successive base groups in the above base sequence to be subjected to error correction, and N is a natural number greater than 1.

It is assumed that the base sequence to be subjected to error correction is “AGCCTACTACCTCT” (SEQ ID NO. 1) and N=6, and then the several following base groups “AGCCTA” (SEQ ID NO. 2), “GCCTAC” (SEQ ID NO. 3), “CCTACT” (SEQ ID NO. 4), “CTACTA” (SEQ ID NO. 5), “TACTAC” (SEQ ID NO. 6), “ACTACC” (SEQ ID NO. 7), "CTACCT" (SEQ ID NO. 8), "TACCTC" (SEQ ID NO. 9) and "ACCTCT" (SEQ ID NO. 10) may be divided from the base sequence to be subjected to error correction.

In the present embodiment, it is assumed that there are three text units: "you", "and" and "me", this text unit "you" is the text unit having the error, and base groups corresponding to "you" include X1, Y1 and Z1, and then X1, Y1 and Z1 are all the above target base groups. If base groups corresponding to "and" are X2 and Y2, and this text unit "and" is also the text unit having the error, then X1, Y1, Z1, X2 and Y2 are all the above target base groups.

A2, error correction is performed on the above base sequence to be subjected to error correction according to the above target base group.

In A1 and A2 above, the base group corresponding to the text unit having the error is positioned in the base sequence to be subjected to error correction, namely determining the target base group, since the determined base group corresponds to the text unit having the error, the determined base group also has an error, that is, by performing error detection on the text unit, a base position having an error can be detected, and then error correction is performed on a base at the base position, thereby achieving error correction of the base sequence to be subjected to error correction.

In some embodiments, considering that the base sequence to be subjected to error correction is coded before error correction, that is, in the case of no error, a relationship between bases in the base sequence to be subjected to error correction shall meet a coding demand during coding, otherwise, if the relationship between the bases does not meet the coding demand during coding, it indicates that the base sequence to be subjected to error correction has an error. That is to say, whether the base sequence to be subjected to error correction has an error may be judged by judging whether the relationship between the bases in the base sequence to be subjected to error correction meets the coding demand during coding. That is, before step S11 above, the method further includes:

detecting whether a base group not meeting a preset coding demand exists in the above base sequence to be subjected to error correction, and deciding the base group not meeting the above preset coding demand as the above target base group, the above preset coding demand being a coding demand adopted to obtain the above base sequence to be subjected to error correction.

Correspondingly, step S11 above includes:

decoding the above base sequence to be subjected to error correction into the first text if the base group not meeting the preset coding demand does not exist in the above base sequence to be subjected to error correction.

In the present embodiment, the above base sequence to be subjected to error correction is divided into a plurality of base groups, for each base group, whether bases in the base group meet the preset coding demand is judged, and if not, it is decided that the base group is a base group having an error, namely deciding the base group as the target base group. Since the target base group is screened according to whether the preset coding demand is met, while the calculation amount is less during comparison, a speed of screening the target base group can be increased. Since only a base group meeting the preset coding demand can be decoded into a corresponding text, performing screening once before decoding out the first text can also guarantee the success of subsequent decoding.

In some embodiments, the above preset coding demand includes:

a proportion of a specified base in the base group meets an above proportion demand, and/or, the base group belongs to a preset base group set, the above preset base group set being used for storing a plurality of preset base groups.

In the present embodiment, the specified base may be one base or two or more bases. When two bases (assuming bases G and C) are specified bases, whether the bases G and C in the base group meet the proportion demand is judged, and if yes, it is decided that the bases in the base group meet the preset coding demand. For example, it is assumed that a coding demand adopted to obtain the base sequence to be subjected to error correction is: a proportion of the bases "G" and "C" in every 6 successive bases is 50%, then, every 6 successive bases in the base sequence to be subjected to error correction are divided into one base group first, then whether the proportion of the bases "G" and "C" in each base group is 50% is judged, and if not, it is decided that the base group is the target base group. It should be pointed out that, if a base group only has a base "G", whether a proportion of the base "G" is 50% is judged alone; if a base group only has a base "C", whether a proportion of the base "C" is 50% is judged alone; and if a base group contains the bases "G" and "C" at the same time, whether a proportion of the base "G" and the base "C" is 50% needs to be judged.

In the present embodiment, one base group set is preset, and this base group set is used for storing a plurality of base groups. Each base group in the base group set can be directly decoded into a corresponding text unit, or, can be decoded into the corresponding text unit after being subjected to certain processing (such as executing a replacement operation). That is, when a base group does not belong to the base group set, it indicates that the base group cannot be decoded into a corresponding text unit, that is to say, the base group is the target base group.

It should be pointed out that, the base groups stored in the base group set do not necessarily include base groups corresponding to permutations and combinations of various bases, therefore, some base groups divided from the base sequence to be subjected to error correction may not belong to the base group set, and at this moment, these base groups not belonging to the base group set are all decided as target base groups.

In some embodiments, step A2 above includes:

A21, all possible base groups are determined according to the above target base group to obtain M candidate base groups, M being a natural number.

Specifically, single bases in the target base group are changed in turn, to achieve traversing of the target base group. For example, it is assumed that the target base group only has one base group, such as "GGCAAT" (SEQ ID NO. 11), and then single bases in the target base group are changed in turn (note that, during replacement, "G" and "C" are mutually replaced, and "T" and "A" are mutually replaced) to obtain "CGCAAT" (SEQ ID NO. 12), "GCCAAT" (SEQ ID NO. 13), "GGGAAT" (SEQ ID NO. 14), "GGCTAT" (SEQ ID NO. 15), "GGCATT" (SEQ ID NO. 16) and "GGCAAA" (SEQ ID NO. 17). It is assumed that the target base group includes two or more base groups, such as "GGCAAT" (SEQ ID NO. 11) and "TACCGA" (SEQ ID NO. 18), similarly, single bases in "GGCAAT" (SEQ ID NO. 11) and "TACCGA" (SEQ ID NO. 18) are changed in turn, and a specific changing process is similar to the process when the target base group only has one base group, which is not repeated here.

In some embodiments, since the target base group may include base groups not belonging to the preset base group set, while the base groups not belonging to the preset base group set cannot be decoded into corresponding text units, in a process of traversing the target base group, if there is a base group not belonging to the preset base group set, this base group is skipped, that is, the base group is not traversed. For example, it is assumed that the target base group includes two base groups "GGCAAT" (SEQ ID NO. 11) and "TACCGA" (SEQ ID NO. 18), while "GGCAAT" (SEQ ID NO. 11) is not within the preset base group set, then "GGCAAT" (SEQ ID NO. 11) is skipped, and single bases in "TACCGA" (SEQ ID NO. 18) are directly changed in turn.

A22, the target base group in the above base sequence to be subjected to error correction is replaced with the above M candidate base groups respectively to obtain M new base sequences, and the above M new base sequences are decoded respectively to obtain M second texts.

Since one candidate base group is obtained every time a base in the target base group is changed, one new base sequence will be obtained after the base sequence to be subjected to error correction is replaced with each candidate base group, that is, the M new base sequences will be obtained after the base sequence to be subjected to error correction is replaced with the M candidate base groups respectively. The M new base sequences can be decoded into M texts, and to be distinguished from other texts, the decoded texts herein are named as the second texts.

A23, one second text is determined from all the above second texts to be used as an error-corrected text corresponding to the above base sequence to be subjected to error correction.

Specifically, a correct second text may be determined from a plurality of second texts by using a preset natural language processing model (e.g., N-gram model).

In A21 to A23 above, since the bases in the target base group are changed one by one, a plurality of possible base group combinations corresponding to the target base group can be obtained, and therefore the M second texts can be obtained after the M new base sequences obtained from the M candidate bases are decoded. That is, as the number of the second texts is increased, the possibility that the correct second text is within the plurality of decoded second texts is increased, so that the probability of obtaining the correct second text is increased, i.e., the success rate of error correction is increased.

In some embodiments, step S13 includes:

B1, the plurality of above text units are input into the preset natural language processing model one by one to obtain scores corresponding to the input text units and output by the natural language processing model.

In the present embodiment, after a text unit is input into the natural language processing model, the natural language processing model will output a score, the higher the score, the higher the probability that the text unit is a wrong text unit, otherwise, the lower the probability that the text unit is a wrong text unit.

In some embodiments, the preset natural language processing model includes an N-gram model. Before error detection is performed on the text units through the N-gram model (assumed as a first N-gram model), a second N-gram model is trained first, and a model obtained after training is the first N-gram model.

In some embodiments, the second N-gram model may be trained by calling a third-party open source library kenlm using python. Since kenlm is a language model tool personally developed by Kenneth Heafield and has the advantages of high speed and small occupied memory, the first N-gram model may be obtained more conveniently by calling kenlm using python.

In some embodiments, the first N-gram model may calculate a corresponding score according to a python3 program below.

```
kn_model=kenlm.Model(filename)
score=math.floor(kn_model.perplexity(sentence))
```

Model is a class related to score calculation defined in kenlm, this class is instantiated to kn_model, filename is a file name of the N-gram model generated by training by calling the kenlm tool using python3, math.floor(x) is used for feeding back a maximum integer less than a parameter x, and sentence is one or a plurality of successive text units to be subjected to score calculation. A relationship between kn_model.perplexity(sentence) and kn_model.score(sentence) above is a=10^(−b/n):

a=kn_model.perplexity(sentence), b=kn_model.score (sentence), and n is the number of the text units plus 1, for example, when sentence is "you and me", n is 4.

B2, when a score corresponding to the above input text unit does not meet a first preset demand, it is decided that the above input text unit is the text unit having the error.

The first preset demand includes: not greater than $10^6$, that is, when the score corresponding to the text unit input into the natural language processing model is greater than $10^6$, it is decided that the text unit is the text unit having the error.

In B1 and B2 above, as the natural language processing model calculates the scores of the text units one by one, by means of the above processing, a single text unit having an error can be identified.

In some embodiments, step S13 includes:

C1, every R successive text units in all the above text units are divided into one group to obtain at least two text unit groups, R being a natural number greater than 1.

Specifically, it is assumed that there are the following text units: a text unit 1, a text unit 2 and a text unit 3, R is 2, and then every R successive text units are divided into one group to obtain: a text unit group of "text unit 1 and text unit 2" and a text unit group of "text unit 2 and text unit 3".

C2, the above text unit groups are input into the above natural language processing model one by one to obtain scores corresponding to the input text unit groups and output by the natural language processing model.

C3, when a score corresponding to an input text unit group above does not meet a second preset demand, it is decided that the above input text unit group is a text unit group having errors, and respective text units included in the above text unit group having the errors are each the above text unit having the error.

The second preset demand is different from the first preset demand, for example, when the first preset demand includes: not greater than $10^6$, the second preset demand may include $2\times10^5$.

In C1 to C3 above, since the natural language processing model outputs the scores corresponding to the text unit groups, while one text unit group is composed of R successive text units and R is greater than 1, the natural language processing model outputs scores corresponding to at least two adjacent text units. That is, by means of the above processing, adjacent text units having an error in neighboring relation can be recognized.

In order to describe the data error correction method provided by the embodiment of the present application more clearly, it is described below in combination with specific examples.

Figure 2:
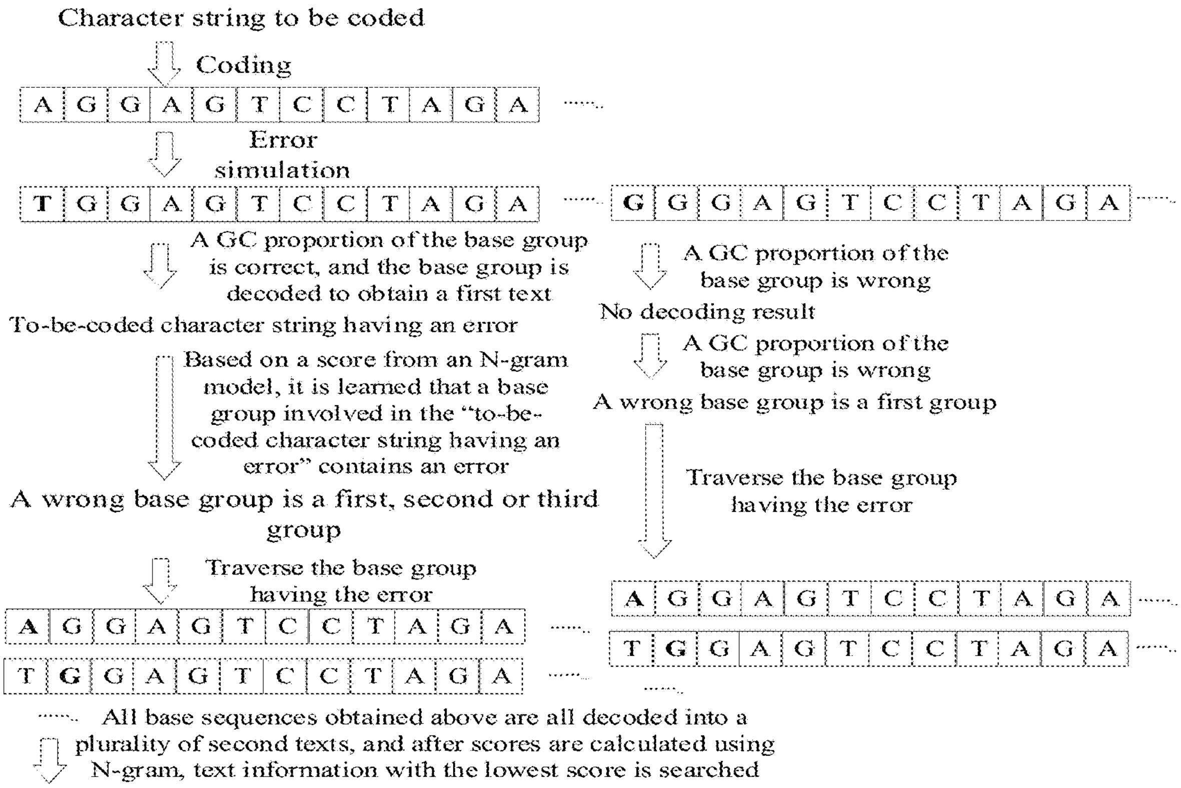
FIG. 2 is a flowchart of another data error correction method provided by an embodiment of the present application.

Referring to FIG. 2, it is assumed that a character string to be coded is coded to obtain a coding result "AGGAGTCCTAGA . . . " (SEQ ID NO. 19), but when the character string to be coded is recovered, the first base in the above coding result has an error and is changed to "TGGAGTCCTAGA . . . " (SEQ ID NO. 20) or "GGGAGTCCTAGA . . . " (SEQ ID NO. 21). It is assumed that a coding demand is taking every 6 successive bases as one base group and a proportion of GC in each base group being 50%, then proportions of GC in the base groups in "TGGAGTCCTAGA . . . " (SEQ ID NO. 20) are both 50%, while a proportion of GC in the first base group "GGGAGT" (SEQ ID NO. 22) in "GGGAGTCCTAGA . . . " (SEQ ID NO. 21) is 66.7%, which does not meet the demand of the GC proportion.

"TGGAGTCCTAGA . . . " (SEQ ID NO. 20) meeting the demand of the GC proportion will be decoded to obtain a first text, afterwards, a score is calculated by using the N-gram model to determine a base group having an error, which is assumed as a first group or a second group or a third group (these base groups having the errors are target base groups), these target base groups are traversed to obtain a plurality of new base sequences, then these new base sequences are decoded into a plurality of second texts, finally scores corresponding to the different second texts are calculated through the N-gram model, and the second text with the lowest score is used as a corrected text.

"GGGAGTCCTAGA . . . " (SEQ ID NO. 21) not meeting the GC proportion is not decoded into a corresponding first text. It is assumed that the base group having the error is the first group, then the first base group is traversed to obtain a plurality of new base sequences, these new base sequences are decoded into a plurality of second texts, finally scores corresponding to the different second texts are calculated through the N-gram model, and the second text with the lowest score is used as the corrected text.

It is to be understood that in the above embodiment, an order of sequence numbers of the steps does not indicate an execution sequence, and execution sequences of various processes shall be determined according to functions and internal logics thereof and shall not impose any limitation on an implementation process of the embodiment of the present application.

Embodiment 2

Figure 3:
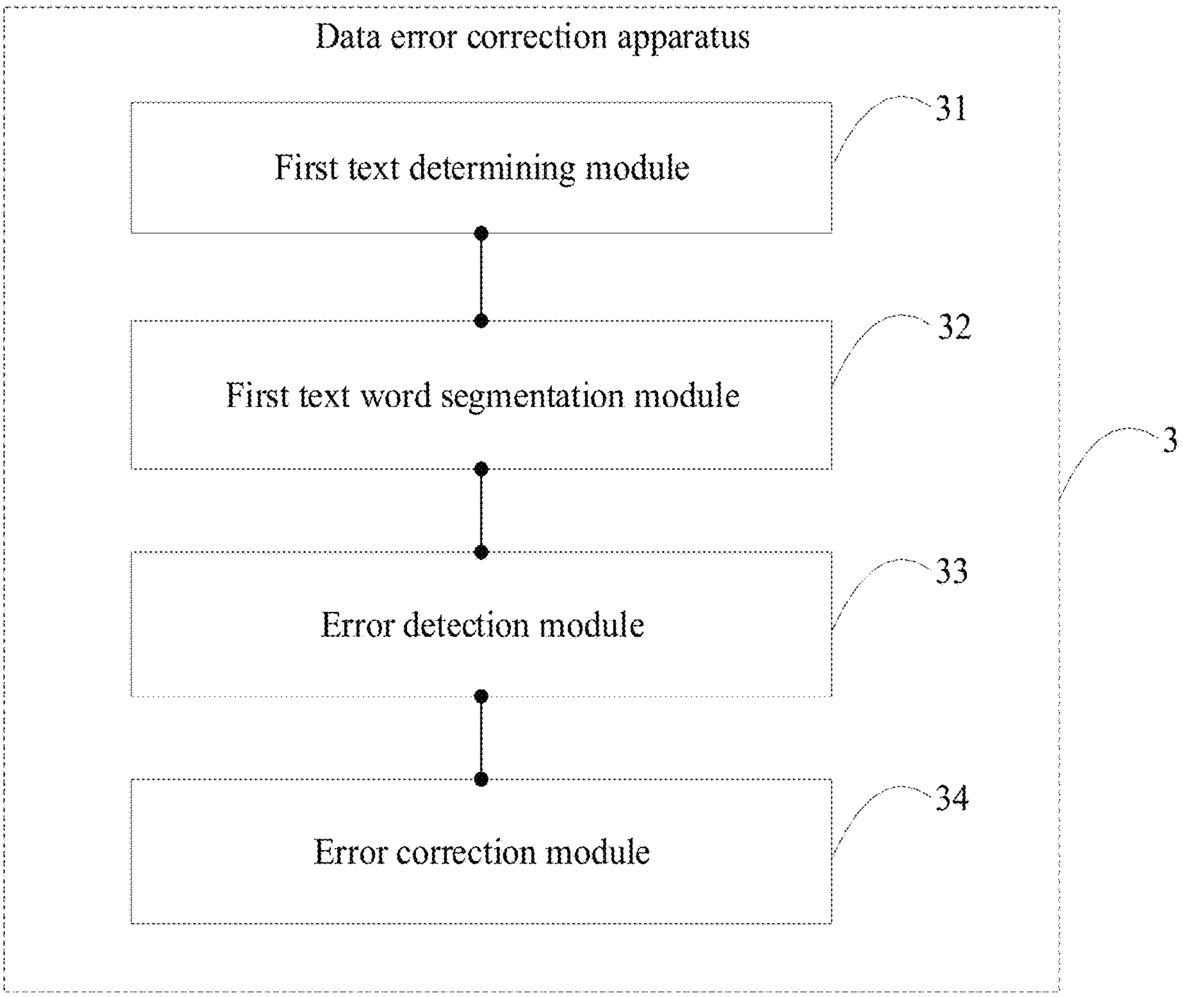
FIG. 3 is a structural block diagram of a data error correction apparatus provided by an embodiment of the present application.

Corresponding to the data error correction method described in the embodiment above, FIG. 3 shows a structural block diagram of a data error correction apparatus provided by an embodiment of the present application. For the convenience of illustration, only parts related to the embodiment of the present application are shown.

Referring to FIG. 3, the data error correction apparatus includes: a first text determining module 31, a first text word segmentation module 32, an error detection module 33 and an error correction module 34.

The first text determining module 31 is configured to decode a base sequence to be subjected to error correction into a first text, the base sequence to be subjected to error correction being composed of a plurality of bases.

The first text word segmentation module 32 is configured to perform word segmentation on the first text to obtain a plurality of text units.

The error detection module 33 is configured to perform error detection on the plurality of text units to obtain a text unit having an error.

The error correction module 34 is configured to perform error correction on the base sequence to be subjected to error correction according to the text unit having the error.

In the embodiment of the present application, since the base sequence to be subjected to error correction is decoded into the first text first before error correction is performed on the base sequence to be subjected to error correction, error detection may be performed on the plurality of text units obtained by word segmentation of the first text through relevant algorithms in the field of natural language processing to obtain the text unit having the error, and then error correction of the base sequence to be subjected to error correction may be achieved according to the text unit having the error. When error detection is performed on the text units through the relevant algorithms in the field of natural language processing, it can be achieved without combining repeatedly stored data, that is, no redundancy needs to be increased during DNA storage. That is, by means of the data error correction method provided by the embodiments of the present application, not only can error correction for data be achieved, but also the redundancy during data storage can be reduced, thereby reducing the storage cost of DNA.

In some embodiments, the error correction module 34 includes:

- a first target base group determining unit, configured to determine a base group having an error according to the text unit having the error to obtain a target base group, wherein each base group is composed of every N successive base groups in the base sequence to be subjected to error correction, and N is a natural number greater than 1; and
- an error correction unit, configured to perform error correction on the base sequence to be subjected to error correction according to the target base group.

In some embodiments, the data error correction apparatus further includes:

- a second target base group determining unit, configured to detect whether a base group not meeting a preset coding demand exists in the base sequence to be subjected to error correction, and decide the base group not meeting the preset coding demand as the target base group, the preset coding demand being a coding demand adopted to obtain the base sequence to be subjected to error correction.

The first text determining module 31 is specifically configured to:

- decode the base sequence to be subjected to error correction into the first text if the base group not meeting the preset coding demand does not exist in the base sequence to be subjected to error correction.

In some embodiments, the preset coding demand includes:

- a proportion of a specified base in the base group meets a proportion demand, and/or, the base group belongs to a preset base group set, the preset base group set being used for storing a plurality of preset base groups.

In the present embodiment, the specified base may be one base or two or more bases.

In some embodiments, the above error correction unit includes:

- a base group traversing unit, configured to determine all possible base groups according to the target base group to obtain M candidate base groups, M being a natural number.

Specifically, single bases in the target base group are changed in turn, to achieve traversing of the target base group.

In some embodiments, since the target base group may include base groups not belonging to the preset base group set, while the base groups not belonging to the preset base group set cannot be decoded into corresponding text units, in a process of traversing the target base group, if there is a base group not belonging to the preset base group set, this base group is skipped, that is, the base group is not traversed.

A second text determining unit is further included, which is configured to replace the target base group in the base sequence to be subjected to error correction with the M candidate base groups respectively to obtain M new base sequences, and decode the M new base sequences respectively to obtain M second texts.

An error-corrected text determining unit is further included, which is configured to determine one second text from all the second texts to be used as the error-corrected text corresponding to the base sequence to be subjected to error correction.

Specifically, a correct second text may be determined from a plurality of second texts by using a preset natural language processing model (e.g., N-gram model).

In some embodiments, the error detection module 33 includes:

- a single-text-unit score determining unit, configured to input the plurality of text units into the preset natural language processing model one by one to obtain scores corresponding to the input text units and output by the natural language processing model.

In some embodiments, the preset natural language processing model includes an N-gram model. Before error detection is performed on the text units through the N-gram model (assumed as a first N-gram model), a second N-gram model is trained first, and a model obtained after training is the first N-gram model.

In some embodiments, the second N-gram model may be trained by calling a third-party open source library kenlm using python. Since kenlm is a language model tool personally developed by Kenneth Heafield and has the advantages of high speed and small occupied memory, the first N-gram model may be obtained more conveniently by calling kenlm using python.

In some embodiments, the first N-gram model may calculate a corresponding score according to the following formula:

$$PP(T) = e^{-\frac{1}{|T|}\sum_{i=1}^{|T|}\log p\left(\omega_i \mid \omega_{i-n+1}^{i-1}\right)}$$

PP(T) is a score, T is a value of “N” in the first N-gram model, and

“$p\left(\omega_i \middle| \omega_{i-n+1}^{i-1}\right)$”

represents a probability of the appearance of $\omega_i$ later when $\omega_{i-n+1}^{i-1}$ appears in a sentence.

A unit for detecting a single wrong text unit is further included, which is configured to decide, when a score corresponding to an input text unit does not meet a first preset demand, that the input text unit is the text unit having the error.

The first preset demand includes: not greater than $10^6$.

In some embodiments, the error detection module 33 further includes:

- a text unit group determining unit, configured to divide every R successive text units in all the text units into one group to obtain at least two text unit groups, R being a natural number greater than 1;
- a text unit group score determining unit, configured to input the text unit groups into the natural language processing model one by one to obtain scores corresponding to the input text unit groups and output by the natural language processing model; and a wrong text unit group detecting unit, configured to decide, when a score corresponding
- to an input text unit group does not meet a second preset demand, that the input text unit group is a text unit group having errors, and that respective text units comprised in the text unit group having the errors are each the text unit having the error.

The second preset demand is different from the first preset demand, for example, when the first preset demand includes: not greater than $10^6$, the second preset demand may include $2\times10^5$.

It should be noted that, the information exchange, an execution process and other content between the above apparatus/units are based on the same concept as the method embodiment of the present application, and thus specific functions thereof and brought technical effects can be specifically found in the method embodiment part, which are not repeated here.

Embodiment 3

Figure 4:
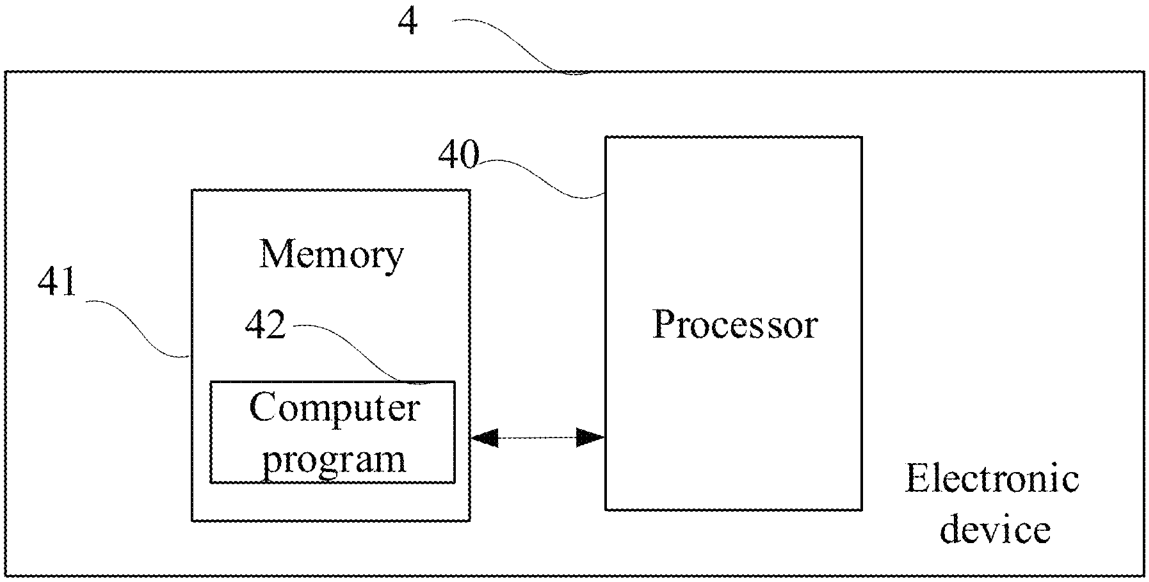
FIG. 4 is a schematic structural diagram of an electronic device provided by an embodiment of the present application.

FIG. 4 is a schematic structural diagram of an electronic device provided by an embodiment of the present application. As shown in FIG. 4, the electronic device 4 of the embodiment includes: at least one processor 40 (only one processor is shown in FIG. 4), a memory 41 and a computer program 42 stored in the memory 41 and capable of running on the at least one processor 40, and the processor 40, when executing the computer program 42, implements the steps in any of the various method embodiments above.

The electronic device 4 may be a computing device such as a table computer, a notebook, a palm computer and a cloud server. The electronic device may include but is not limited to the processor 40 and the memory 41. Those skilled in the art can understand that FIG. 4 is only an example of the electronic device 4 and does not constitute a limitation to the electronic device 4, the electronic device may include more or less components as shown in the figure, or combine some components, or different components, for example, the electronic device may further include an input/output device, a network access device, etc.

The processor 40 may be a central processing unit (CPU), and the processor 40 may also be other general-purpose processors, digital signal processors (DSPs), application specific integrated circuits (ASICs), field-programmable gate arrays (FPGAs) or other programmable logic devices, discrete gate or transistor logic devices, discrete hardware components, etc. The general-purpose processor may be a microprocessor, or the processor may also be any conventional processor, etc.

The memory 41 may be an internal storage unit of the electronic device 4 in some embodiments, such as a hard disk or internal memory of the electronic device 4. The memory 41 may also be an external storage device of the electronic device 4 in other embodiments, such as a plug-in hard disk, a smart media card (SMC), a secure digital (SD) card, a flash card, etc. provided on the electronic device 4. Further, the memory 41 may also include both the internal storage unit and the external storage device of the electronic device 4. The memory 41 is used to store an operating system, an application program, a BootLoader, data, and other programs, such as program codes of the computer program. The memory 41 may also be used to temporarily store data that have been output or will be output.

Those skilled in the art can clearly understand that, for the convenience and conciseness of description, only the division of various functional units and modules mentioned above is given as an example. In practical applications, the above functions may be assigned to different functional units and modules according to needs, that is, the internal structure of the apparatus is divided into different functional units or modules to complete all or part of the functions described above. The various functional units and modules in the embodiments may be integrated into one processing unit, or each of the units may exist alone physically, or two or more units may be integrated into one unit. The integrated units mentioned above may be implemented in the form of hardware or in the form of software functional units. In addition, the specific names of the various functional units and modules are only for the purpose of distinguishing them from each other and are not used to limit the scope of protection of the present application. The specific working process of the units and modules in the above system may refer to the corresponding process in the aforementioned method, and will not be repeated here.

An embodiment of the present application further provides a network device. The network device includes: at least one processor, a memory and a computer program stored in the memory and capable of running on the at least one processor, and the processor, when executing the computer program, implements the steps in any of the various method embodiments above.

An embodiment of the present application further provides a computer-readable storage medium. The computer-readable storage medium stores a computer program, and the computer program, when executed by a processor, implements the steps in the various method embodiments above.

An embodiment of the present application provides a computer program product. The computer program product, when running on an electronic device, causes the electronic device to implement the steps in the various method embodiments above.

If the integrated units are implemented in the form of software functional units and are sold or used as independent products, the units may be stored in a computer-readable storage medium. Based on this understanding, all or part of the flows in the method of the above embodiment are implemented by the present application, and may be completed by instructing relevant hardware through a computer program. The computer program may be stored in a computer-readable storage medium, and the computer program, when executed by a processor, may implement the steps of the various method embodiments above. The computer program includes a computer program code, which may be in the form of a source code, an object code, an executable file or some intermediate forms. The computer-readable medium may at least include: any entity or apparatus capable of carrying the computer program code into a picture taking apparatus/electronic device, a recording medium, a computer memory, a read-only memory (ROM), a random access memory (RAM), an electric carrier signal, a telecom signal and a software distribution medium, such as a USB disk, a mobile hard disk, a magnetic disk or an optic disk. In some jurisdictions, according to legislation and patent practice, the computer-readable medium may not be an electric carrier signal or a telecom signal.

In the above embodiments, the description of each embodiment has its own focus. For the parts that are not described in detail or recorded in a certain embodiment, please refer to the related descriptions of other embodiments.

A person of ordinary skill in the art may recognize that the exemplary units and algorithm steps described with reference to the embodiments disclosed herein can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it shall not be considered that the implementation goes beyond the scope of the present application.

In the embodiments provided in the present application, it should be understood that the disclosed apparatus/network device and method may be implemented in other manners. For example, the apparatus/network device embodiments described above are merely schematic. For example, the division of the modules or units is merely logical function division and may be other division in actual implementation. For example, a plurality of units or assemblies may be combined or integrated into another system, or some features may be ignored or not performed. In addition, the displayed or discussed mutual couplings or direct couplings or communication connections may be via some interfaces, and the indirect couplings or communication connections between the apparatuses or units may be in electric, mechanical, or other forms.

The units described as separate parts may or may not be physically separate, and the parts displayed as units may or may not be physical units, may be located in one position, or may be distributed on a plurality of network units. Part or all of the units may be selected according to actual needs to achieve the objectives of the solutions of the embodiments.

What is claimed is:

1. A data error correction method, using DNA as an information, comprising:

decoding a base sequence to be subjected to error correction into a first text, the base sequence to be subjected to error correction being composed of a plurality of bases on the DNA;

performing word segmentation on the first text to obtain a plurality of text units;

performing error detection on the plurality of text units to obtain a text unit having an error; and performing error correction on the base sequence to be subjected to error correction according to the text unit having the error;

wherein performing error correction on the base sequence to be subjected to error correction according to the text unit having the error comprises:

determining a base group having an error according to the text unit having the error to obtain a target base group, wherein each base group is composed of every N successive base groups in the base sequence to be subjected to error correction, and N is a natural number greater than 1; and performing error correction on the base sequence to be subjected to error correction according to the target base group;

wherein before decoding the base sequence to be subjected to error correction into the first text, the method further comprises:

detecting whether a base group not meeting a preset coding demand exists in the base sequence to be subjected to error correction, and deciding the base group not meeting the preset coding demand as the target base group, the preset coding demand being a coding demand adopted to obtain the base sequence to be subjected to error correction; and decoding the base sequence to be subjected to error correction into the first text comprises:

decoding the base sequence to be subjected to error correction into the first text if the base group not meeting the preset coding demand does not exist in the base sequence to be subjected to error correction.

2. The data error correction method according to claim 1, wherein the preset coding demand comprises:

a proportion of a specified base in the base group meets a proportion demand, and/or, the base group belongs to a preset base group set, the preset base group set being used for storing a plurality of preset base groups.

3. The data error correction method according to claim 2, wherein performing error correction on the base sequence to be subjected to error correction according to the target base group comprises:

determining all possible base groups according to the target base group to obtain M candidate base groups, M being a natural number;

replacing the target base group in the base sequence to be subjected to error correction with the M candidate base groups respectively to obtain M new base sequences, and decoding the M new base sequences respectively to obtain M second texts; and determining one second text from all the second texts to be used as an error-corrected text corresponding to the base sequence to be subjected to error correction.

4. The data error correction method according to claim 2, wherein performing error detection on the plurality of text units to obtain the text unit having the error comprises:

inputting the plurality of text units into a preset natural language processing model one by one to obtain scores corresponding to the input text units and output by the natural language processing model; and deciding, when a score corresponding to an input text unit does not meet a first preset demand, that the input text unit is the text unit having the error.

5. The data error correction method according to claim 4, wherein performing error detection on the plurality of text units to obtain the text unit having the error comprises:

dividing every R successive text units in all the text units into one group to obtain at least two text unit groups, R being a natural number greater than 1;

inputting the text unit groups into the natural language processing model one by one to obtain scores corresponding to the input text unit groups and output by the natural language processing model; and deciding, when a score corresponding to an input text unit group does not meet a second preset demand, that the input text unit group is a text unit group having errors, and that respective text units comprised in the text unit group having the errors are each the text unit having the error.

6. An electronic device, comprising a memory, a processor and a computer program stored in the memory and capable of running on the processor, wherein the processor, when executing the computer program, implements the method according to claim 1.

* * * * *